(12) United States Patent
Zhang et al.

(10) Patent No.: US 10,564,932 B2
(45) Date of Patent: Feb. 18, 2020

(54) METHODS FOR CALCULATING FLOATING-POINT OPERANDS AND APPARATUSES USING THE SAME

(71) Applicant: VIA Alliance Semiconductor Co., Ltd., Shanghai (CN)

(72) Inventors: Zhi Zhang, Beijing (CN); Jing Chen, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 136 days.

(21) Appl. No.: 15/426,391

(22) Filed: Feb. 7, 2017

(65) Prior Publication Data

US 2018/0150282 A1 May 31, 2018

(30) Foreign Application Priority Data

Nov. 30, 2016 (CN) .......................... 2016 1 1090929

(51) Int. Cl.
*G06F 7/499* (2006.01)
*G06F 7/483* (2006.01)

(52) U.S. Cl.
CPC .......... *G06F 7/49905* (2013.01); *G06F 7/483* (2013.01); *G06F 2207/382* (2013.01)

(58) Field of Classification Search
CPC ....... H03M 7/24; G06F 7/556; G06F 2101/10
USPC ......................................................... 708/204
See application file for complete search history.

(56) References Cited

U.S. PATENT DOCUMENTS

| 4,949,291 A | * | 8/1990 | Saini | .................. G06F 5/00 |
| | | | | 708/204 |
| 5,523,961 A | * | 6/1996 | Naini | .................. H03M 7/24 |
| | | | | 708/204 |

FOREIGN PATENT DOCUMENTS

| CN | 102103479 A | 6/2011 |
| TW | 201102914 A | 1/2011 |

OTHER PUBLICATIONS

Floating-Point Unit, Intel Architecture Software Developer's Manual, Chapter 31 (Year: 1998).*
English language abstract of "Broadview: The conversion of the precision of the floating number."

* cited by examiner

*Primary Examiner* — Andrew Caldwell
*Assistant Examiner* — Emily E Larocque
(74) *Attorney, Agent, or Firm* — McClure, Qualey & Rodack, LLP (57) ABSTRACT

The invention introduces a method for calculating floating-point operands, which contains at least the following steps: receiving an FP (floating-point) operand in a first format from a source register, wherein the first format is one of a group of first formats of different kinds; converting the FP operand in the first format into an FP operand in a second format; generating a calculation result in the second format by calculating the FP operand in the second format; converting the calculation result in the second format into a calculation result in the first format; and writing-back the calculation result of the first format.

18 Claims, 6 Drawing Sheets

METHODS FOR CALCULATING FLOATING-POINT OPERANDS AND APPARATUSES USING THE SAME

CROSS REFERENCE TO RELATED APPLICATIONS

This application claims the benefit of China Patent Application No. 201611090929.3, filed on Nov. 30, 2016, the entirety of which is incorporated by reference herein.

BACKGROUND

Technical Field

The present invention relates to microprocessor, and in particular, to methods for calculating floating-point operands and apparatuses using the same.

Description of the Related Art

In the CPU (central processing unit) of a computer, micro-operations (also known as μops) are low-level instructions to implement complex machine instructions (also known as macro-instructions or computer instructions). Usually, micro-operations perform basic operations on data stored in one or more registers, including transferring data between registers or between registers and external buses of the CPU, and performing arithmetic or logical operations on data in registers. In a typical fetch-decode-execute cycle, a computer instruction is decomposed to generate a series of micro-operations, so that the CPU determines and executes the series of micro-operations.

Floating-point instructions defined in the x86 instruction set may contain x87 or SIMD (Single Instruction Multiple Data) floating-point operands. The x87 operands may be expressed in EP (Extension Precision) 80 (80 bits). The SIMD operands may be expressed in four SP (Single Precision) (32 bits) or two DP (Double Precision) (64 bits). In order to handle arithmetic operations, such as multiplications, divisions, etc., with different formats of floating-point operands, the conventional design requires different FPUs (Floating-point Processing Units) and data paths, resulting in increased hardware cost. Therefore, what is needed are methods for calculating floating-point operands and apparatuses using the same to reduce the cost of hardware.

BRIEF SUMMARY

An embodiment of the invention introduces a method for calculating floating-point operands implemented in an execution unit of a microprocessor, which contains at least the following steps: receiving an FP (floating-point) operand in a first format from a source register, where the first format is one of a plurality of first formats of different kinds; converting the FP operand in the first format into an FP operand in a second format; generating a calculation result in the second format by calculating the FP operand in the second format; converting the calculation result in the second format into a calculation result in the first format; and writing-back the calculation result of the first format.

An embodiment of the invention introduces an apparatus for calculating floating-point operands implemented in an execution unit of a microprocessor, at least containing: a first format converter; a calculation unit coupled to the first format converter; and a second format converter coupled to the calculation unit. The first format converter receives an FP operand in a first format from a source register and converts the FP operand in the first format into an FP operand in a second format, where the first format is one of a plurality of first formats of different kinds. The coupled calculation unit generates a calculation result in the second format by calculating the FP operand in the second format. The second format converter converts the calculation result in the second format into a calculation result in the first format and writes back the calculation result of the first format.

The second format uses more bits to express the FP operand than those used in any first format.

Methods practiced in the format converters may reuse the FPU (floating-point unit) supporting the FP operand in the second format to deal with the input parameters of the FP operands in different first formats, rather than providing different FPUs for the input parameters of the FP operands in different first formats, so as to reduce circuit size. In the FPU for more complex FP calculations (such as an FP multiplication, an FP division, etc.), since the circuit size of these kinds of FPUs are large, adopting the re-used FPU introduced by the invention yields significant savings.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
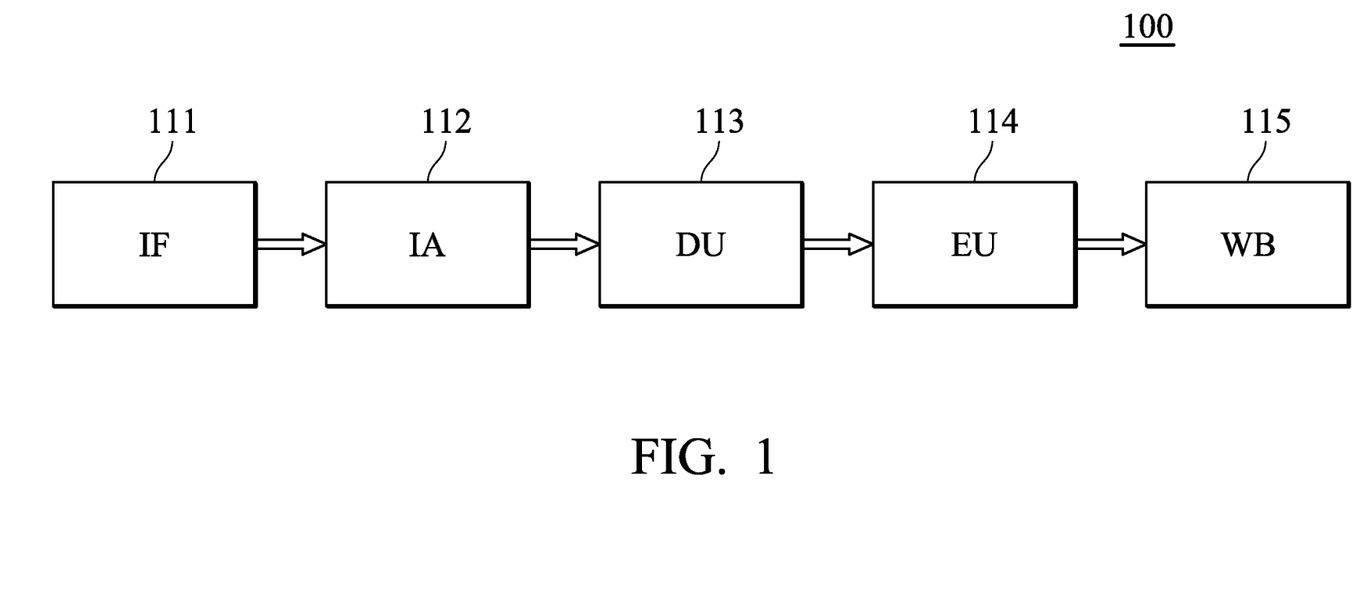
FIG. 1 is a system diagram of a microprocessor of a pipe-stage RISC (Reduced instruction set computing) according to one embodiment of the present invention.

FIG. 1 is a system diagram of a microprocessor of a pipe-stage RISC (Reduced instruction set computing) according to one embodiment of the present invention. Pipe-stages of a microprocessor 100 may include an IF (Instruction Fetch) 111, an IA (Instruction Access) 112, a DU (Decode Unit) 113, an EU (Execution Unit) 114 and a WB (Write Back) 115. A PC (Program Counter) (not shown) is a register responsible for holding the address of the current instruction. The IF 111 may read an address from the PC. The IA 112 fetches macro-instructions for calculating FP (floating-point) operands from an instruction cache (not shown) according to the address. The DU 113 translates one computer instruction into one or more micro-operations, each of which includes an opcode (operation code) and an operand, and latches the opcode and the operand in an instruction register (not shown) and a source register (not shown), respectively. The source register is a 128-bit register, which latches an operand comprising one or more FP operands. The micro-operation generated by the DU 113 further contains size information. The size information and the FP operand are transmitted to the EU 114 at the same clock cycle, thereby enabling the EU 114 to recognize the format of the FP operand. In an embodiment, the size information may indicate the format of the FP operand in two bits. For example, the binary value "2'b00" indicates an EP (extension precision, for example, 80 bits) FP operand, the binary value "2'b01" indicates an SPFP (single-precision floating-point) operand and the binary value "2'b10" indicates a DPFP (double-precision floating-point) operand. The EU 114 reads a sign bit, an exponent and a mantissa of the FP operand according to the size information and converts the FP operand into an EP82 (extension precision in 82 bits) FP operand. Subsequently, the EU 114 performs an arithmetic operation, such as a multiplication, a division, etc., on the EP82 FP operand to generate a calculation result of the EP82 FP operand. Finally, the EU 114 converts the calculation result of the EP82 FP operand into the calculation result of the original format, such as the EP, SP or DP FP, etc. according to the size information, and writes the calculation result of the original format, for example, back to the WB 115. The WB 115 may write the calculation result into a register file.

Figure 2:
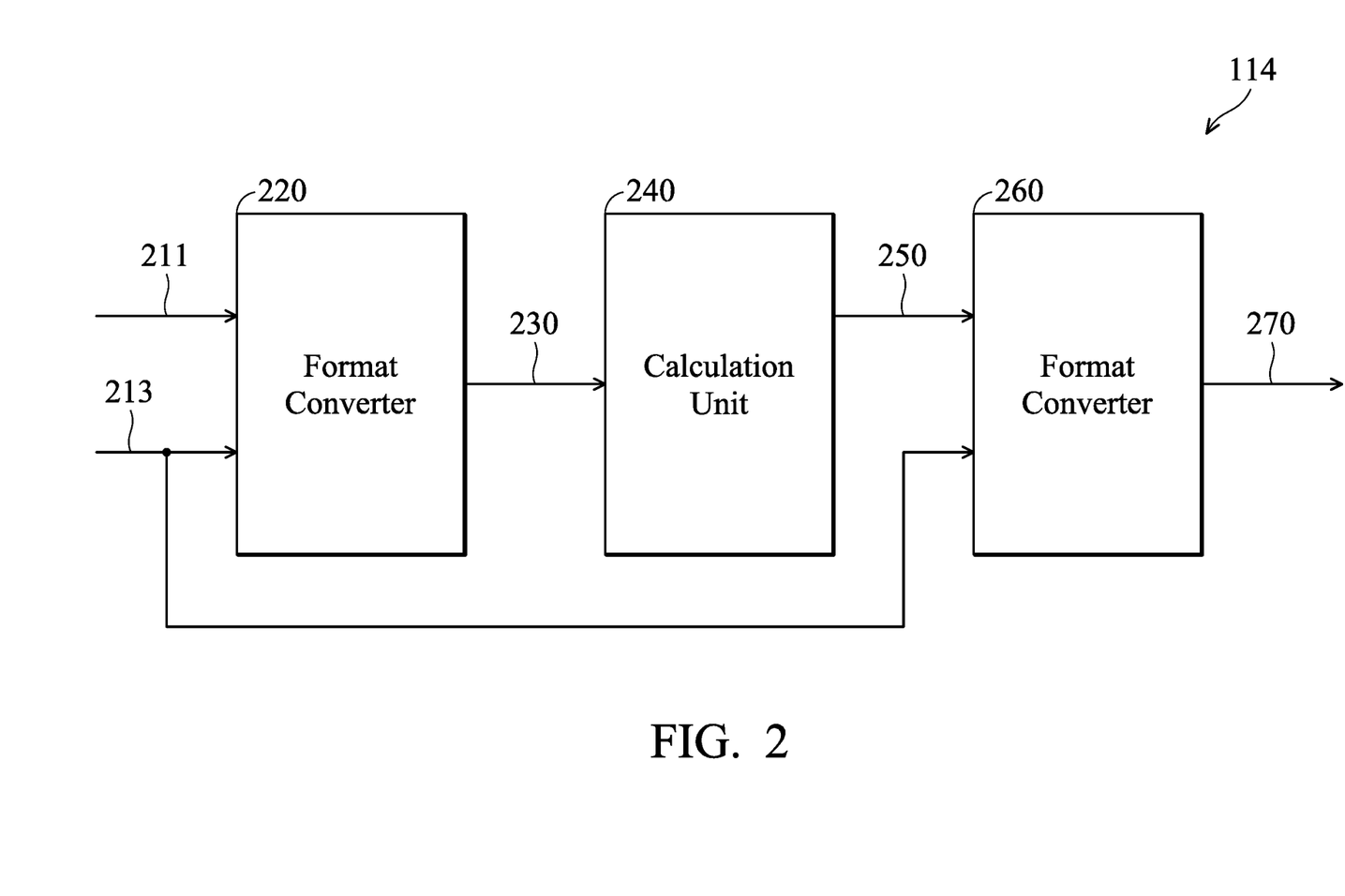
FIG. 2 is a block diagram of an EU (Execution Unit) according to an embodiment of the invention.

FIG. 2 is a block diagram of an EU according to an embodiment of the invention. The EU 114 contains a format converter 220, a calculation unit 240 and a format converter 260. The calculation unit 240 may be an adder, a multiplier, a divider, etc. for calculating an EP82 FP operand. The format converter 220 employs one of a plurality of conversion procedures to convert one of an EPFP, an SPFP and a DPFP operands 211 into an EP82 FP operand 230 according to the size information 213 and outputs the EP82 FP operand to the calculation unit 240. For example, when the received size information is "2'b00", the format converter 220 converts an EPFP operand into an EP82 FP operand. When the received size information is "2'b01", the format converter 220 converts an SPFP operand into an EP82 FP operand. When the received size information is "2'b10", the format converter 220 converts a DPFP operand into an EP82 FP operand. The calculation unit 240 calculates the EP82 FP operand to generate a calculation result 250 of the EP82 FP operand and outputs the calculation result 250 of the EP82 FP operand to the format converter 260. In an embodiment, the calculation unit 240 further contains an exponent calculation module (not shown) and a mantissa calculation module (not shown) to calculate the exponent and the mantissa of the EP82 FP operand respectively, so as to complete an arithmetic operation, such as an addition, a multiplication, a division etc. The format converter 260 employs one of a plurality of inverse-conversion procedures to convert the calculation result 250 of the EP82 FP operand into a calculation result 270 of the designated EPFP, SPFP or DPFP operand according to the size information 213 and writes the calculation result 270, for example, back to the WB 115. For example, when the received size information is "2'b00", the format converter 260 converts a calculation result of the EP82 FP operand into a calculation result of the EPFP operand. When the received size information is "2'b01", the format converter 260 converts a calculation result of the EP82 FP operand into a calculation result of the SPFP operand. When the received size information is "2'b10", the format converter 260 converts a calculation result of the EP82 FP operand into a calculation result of the DPFP operand.

Figure 6:
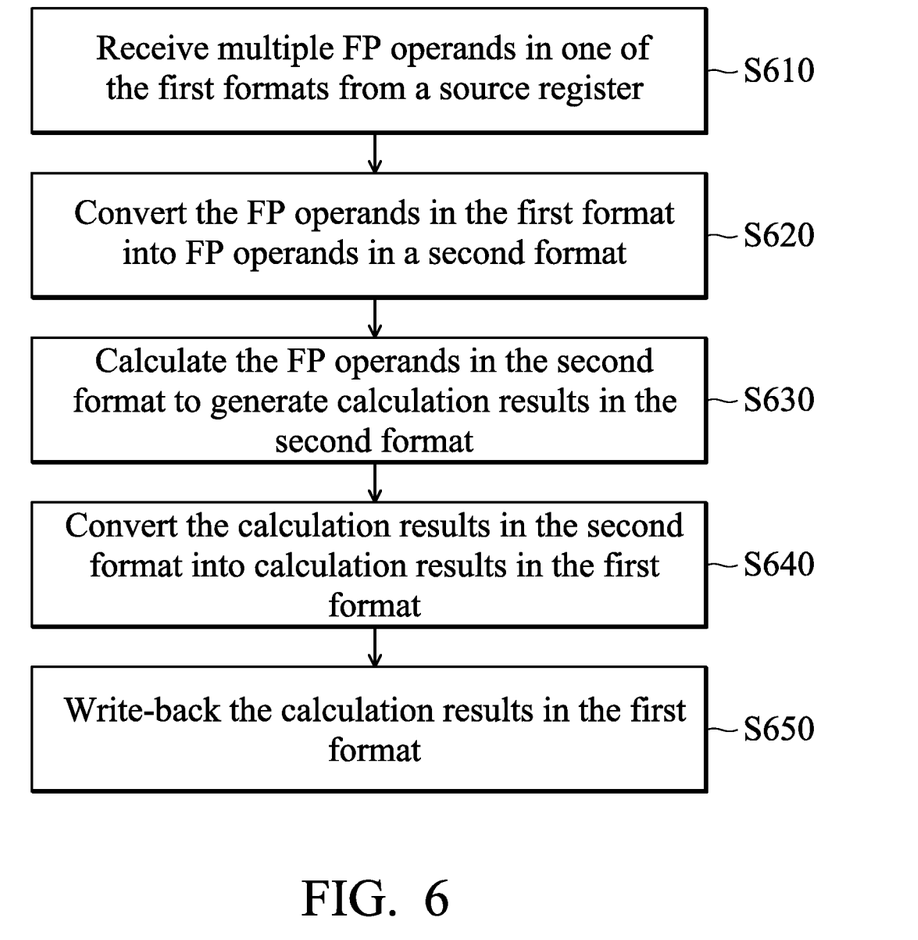
FIG. 6 is a flowchart of a method for calculating FP operands according to an embodiment of the invention.

FIG. 6 is a flowchart of a method for calculating FP operands according to an embodiment of the invention. The method is performed in the EU 114 of the microprocessor 100 and contains the following steps: receiving multiple FP operands in one of the first formats from a source register, where the first formats may be the EP, SP and DP (step S610); converting the FP operands in the first format into FP operands in a second format, where the second format uses more bits to express an FP operand than those used in any first format and may be the EP82 (step S620); calculating the FP operands in the second format to generate calculation results in the second format, for example, performing a arithmetic operation, such as an addition, a multiplication, a division, etc., on the FP operands in the second format (step S630); converting the calculation results in the second format into calculation results in the first format, wherein the first format is one of a plurality of first formats of different kinds (step S640); and writing-back the calculation results in the first format (step S650). In an embodiment, step S620 further contains: employing one of a plurality of conversion procedures to convert FP operands in the first format into FP operands in the second format according to the size information indicating which first format the FP operands latched in a source register belongs to. In an embodiment, step S640 further contains employing one of a plurality of inverse-conversion procedures to convert calculation results in the second format into calculation results in the first format according to the size information. Specifically, the conversion procedure of step S620 includes operations to exponents and mantissas. The sign bit, such as the bit[79] of EP, the bit[31] of SP and the bit[63] of DP, remains the same. As to the exponents, the conversion procedure places the MSB (Most Significant Bit) of the exponent of each FP operand in the first format into the MSB of the exponent of the respective FP operand in the second format, places the inverse of the MSB of the exponent of each FP operand in the first format into each of n bits following the MSB of the exponent of the respective FP operand in the second format, and places the remaining bits of the exponent of each FP operand in the first format into the remaining bits of the exponent of the respective FP operand in the second format, in which n is the bit count of the exponent of the FP operand in the first format subtracted from the bit count of the exponent of the FP operand in the respective second format (that is, the difference between the bit counts of the exponents in the second format and the respective first format). As for the mantissas, the conversion procedure does not process the mantissa of the EPFP operand. Thus, the following only discusses the processes performed on the mantissas of the SP and DP FP operands. The conversion procedure places an imply bit, such as "2'b1", in the MSB of the mantissa of each FP operand in the second format, places the mantissa value of each FP operand in the first format in the m significant bits following the MSB of the mantissa of the respective FP operand in the second format (m is the bit count of the mantissa of one FP operand in the first format) and fills each of the remaining bits of the mantissa of the respective FP operand in the second format with "2'b0". Detailed examples of the conversion procedures are provided below.

Figure 3:
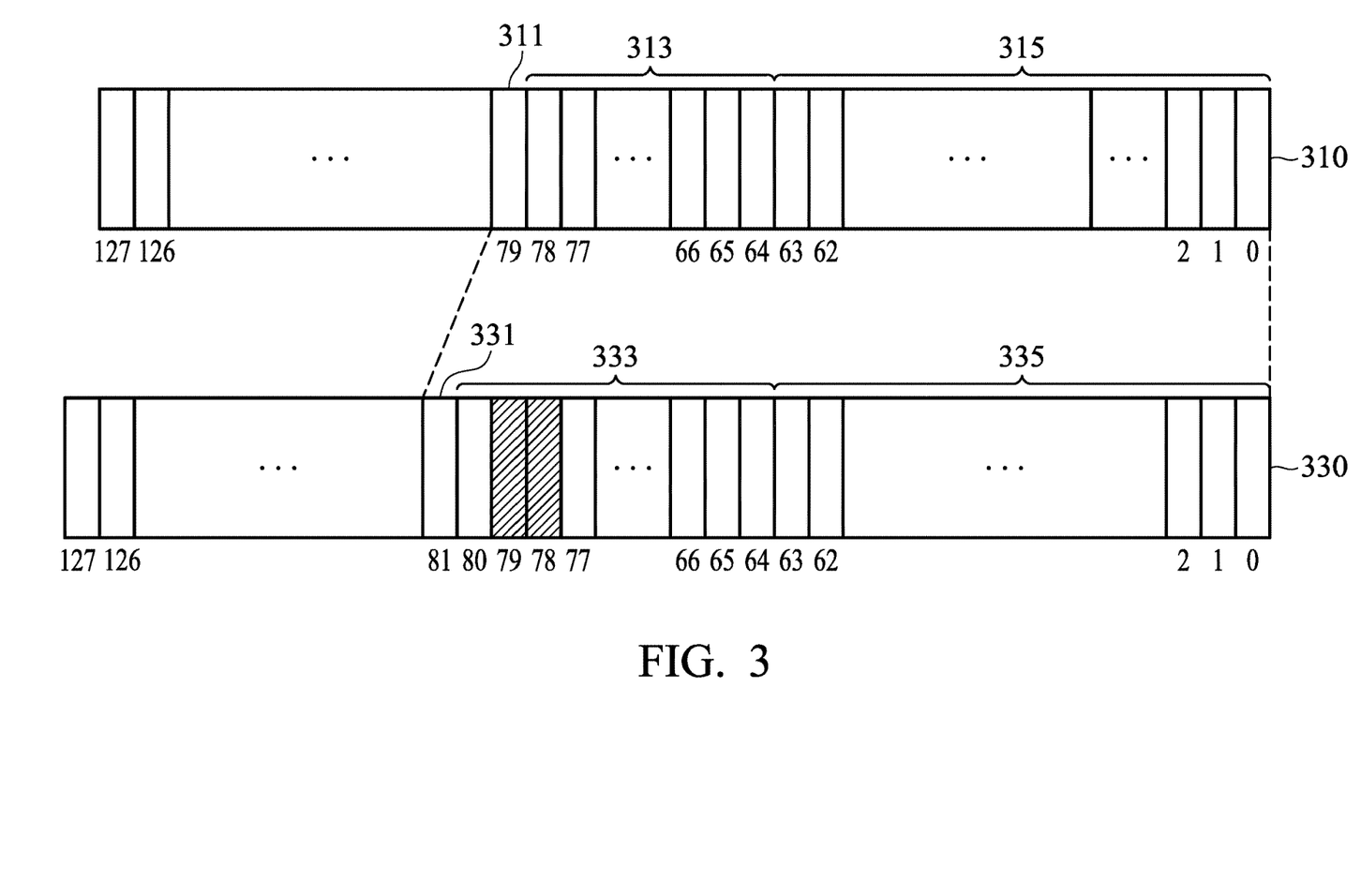
FIG. 3 is a schematic diagram illustrating the conversion of an EP (extension precision) FP (floating-point) operand into an EP82 (extension precision in 82 bits) FP operand according to an embodiment of the invention.

FIG. 3 is a schematic diagram illustrating the conversion of an EPFP operand into an EP82 FP operand according to an embodiment of the invention. One source register of 128 bits latches one EPFP operand 310 that contains a sign bit of one bit (bit[79]), an exponent of 15 bits (bits[78:64]) and the mantissa of 64 bits (bits[63:0]). In the conversion procedure of the EPFP operand 310 into the EP82 FP operand 330, the format converter 220 extends the exponent 313 of 15 bits to the exponent 333 of 17 bits and maintains the mantissa of 64 bits. Specifically, the format converter 220 places the sign bit 311 (bit[79]) of the EPFP operand 310 into the sign bit 331 (bit[81]) of the EP82 FP operand 330. The format converter 220 places the bit[78] of the exponent 313 of the EPFP operand 310 into the bit[80] of the exponent 333 of the EP82 FP operand 330, fills each of the bits[79:78] (in slashes) of the exponent 333 of the EP82 FP operand 330 with the inverse of the bit[78] of the exponent 313 of the EPFP operand 310, and places the bits[77:64] of the exponent 313 of the EPFP operand 310 into the bits[77:64] of the exponent 333 of the EP82 FP operand 330. For example, when the value of bit[78] of the exponent 313 of the EPFP operand 310 is "2'b0", the value of bits[79:78] of the exponent 333 of the EP82 FP operand 330 are filled with "2'b11". The format converter 220 places the mantissa 315 (bits[63:0]) of the EPFP operand 310 into the mantissa 335 (bits[63:0]) of the EP82 FP operand 335.

Figure 4:
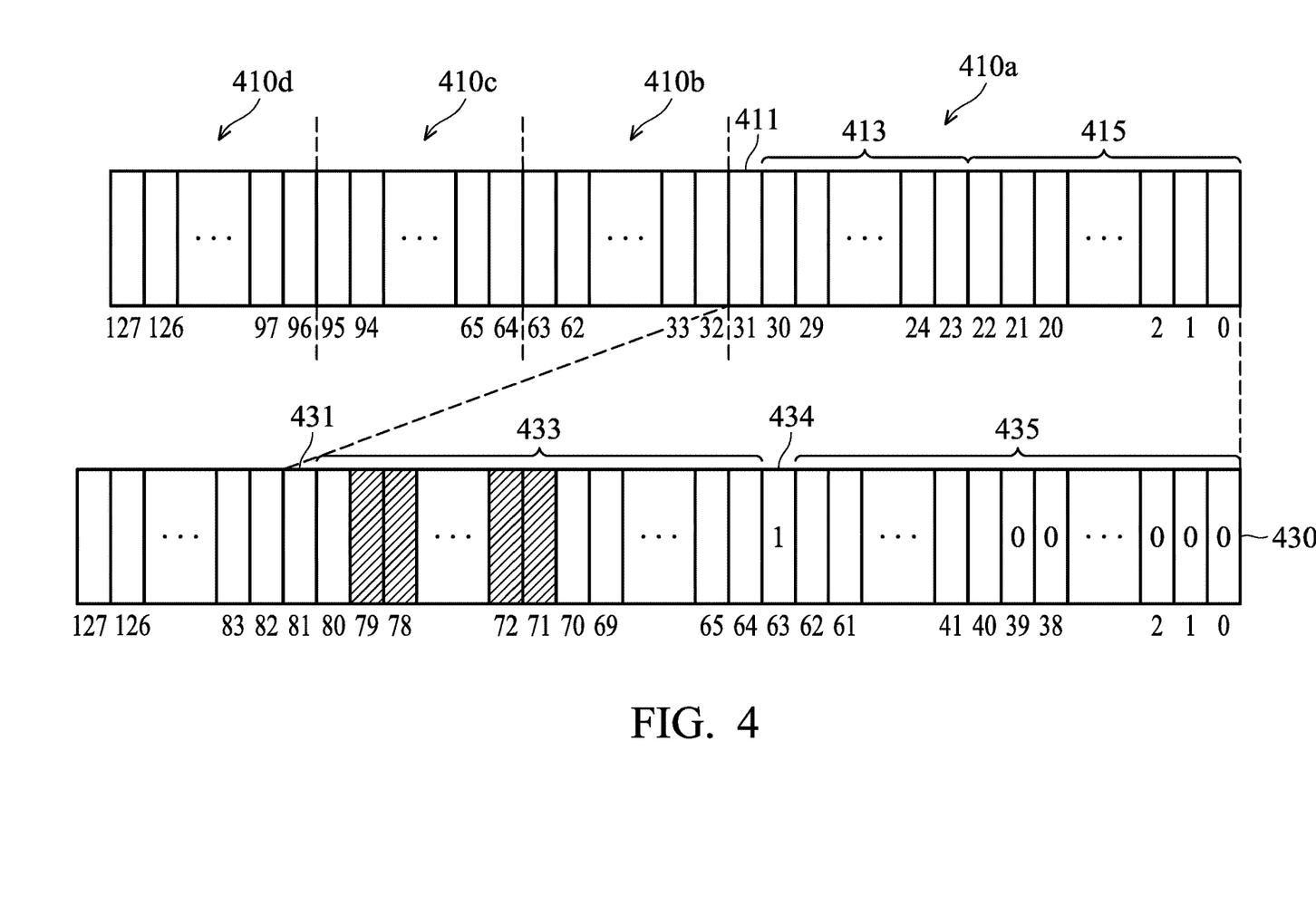
FIG. 4 is a schematic diagram illustrating the conversion of an SP FP (single-point floating-point) operand into an EP82 FP operand according to an embodiment of the invention.

FIG. 4 is a schematic diagram illustrating the conversion of an SPFP operand into an EP82 FP operand according to an embodiment of the invention. One 128-bit source register latches four SPFP operands 410a to 410d. The following uses the SPFP operand 410a as an example to explain the conversion in detail. Those skilled in the art will realize that the conversion details for the SPFP operands 410b to 410d can be deduced by analogy and the detailed descriptions for the SPFP operands 410b to 410d are omitted for brevity. The SPFP operand 410a contains the sign bit 411 of one bit (bit[31]), the exponent 413 of 8 bits (bits[30:23]) and the mantissa 415 of 23 bits (bits[22:0]). In the conversion procedure of the SPFP operand 410a into the EP82 FP operand 430, the format converter 220 extends the exponent 413 of 8 bits to the exponent 433 of 17 bits, extends the mantissa 415 of 23 bits to the mantissa 435 of 63 bits and inserts the imply bit "2'b1" 434 between the exponent 433 and the mantissa 435. Specifically, the format converter 220 places the sign bit 411 (bit[31]) of the SPFP operand 410a into the sign bit 431 (bit[81]) of the EP82 FP operand 430. The format converter 220 places the bit[30] of the exponent 413 of the SPFP operand 410a into the bit[80] of the exponent 433 of the EP82 FP operand 430, fills each of the bits[79:71](in slashes) of the exponent 433 of the EP82 FP operand 430 with the inverse of the bit[30] of the exponent 413 of the SPFP operand 410a, and places the bits[29:23] of the exponent 413 of the SPFP operand 410a into the bits[70:64] of the exponent 433 of the EP82 FP operand 430. For example, when the value of bit[30] of the exponent 413 of the SPFP operand 410a is "2'b1", the value of bits[79:71] of the exponent 433 of the EP82 FP operand 430 are filled with "2'b000000000". The format converter 220 fills the imply bit 434 (bit[63]) of the EP82 FP operand 430 with "2'b1" ("2'b1" is a default value to indicate that the second format is the EP82 FP and the default value may be changed to another to indicate a different format in some other embodiments), places the mantissa 415 (bits[22:0]) of the SPFP operand 410a into the significant bits (bits[62:40]) of the mantissa 435 of the EP82 FP operand 430 and fills each of the remaining bits (bits[39:0]) of the mantissa 435 of the EP82 FP operand 430 with "2'b0".

Figure 5:
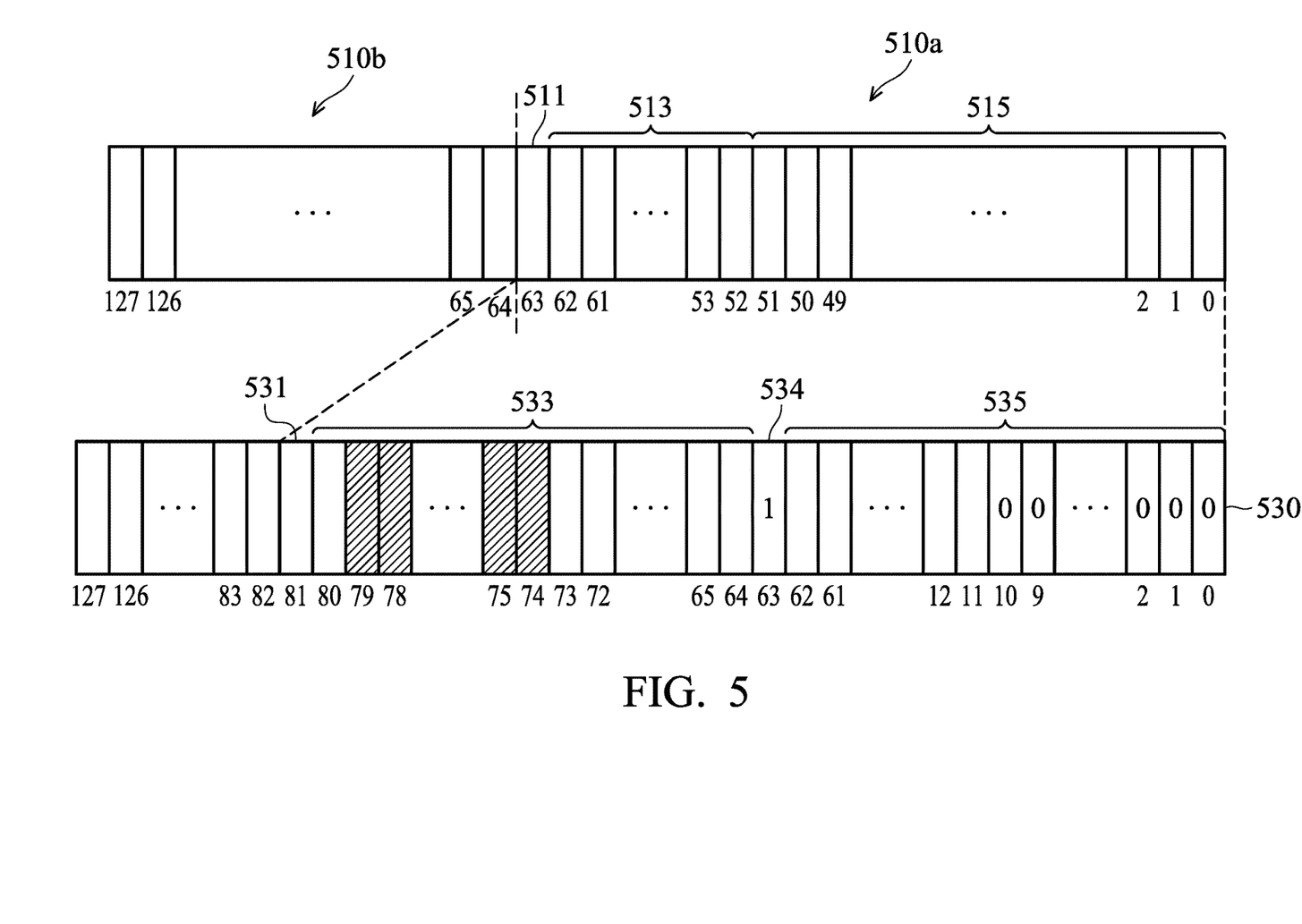
FIG. 5 is a schematic diagram illustrating the conversion of a DP FP (double-precision floating-point) operand into an EP82 FP operand according to an embodiment of the invention.

FIG. 5 is a schematic diagram illustrating the conversion of a DPFP operand into an EP82 FP operand according to an embodiment of the invention. One 128-bit source register latches two DPFP operands 510a to 510b. The following uses the DPFP operand 510a as an example to explain the details of the conversion. Those skilled in the art will realize that details of the conversion for the DPFP operand 510b can be deduced by analogy and detailed descriptions of the DPFP operand 510b are omitted for brevity. The DPFP operand 510a contains the sign bit 511 of one bit (bit[63]), the exponent 513 of 11 bits (bits[62:52]) and the mantissa 515 of 52 bits (bits[51:0]). In the procedure for converting the DPFP operand 510a into the EP82 FP operand 530, the format converter 220 extends the exponent 513 of 11 bits to the exponent 533 of 17 bits, extends the mantissa 515 of 52 bits to the mantissa 535 of 63 bits and inserts the imply bit "2'b1" 534 between the exponent 533 and the mantissa 535. Specifically, the format converter 220 places the sign bit 511 (bit[63]) of the DPFP operand 510a into the sign bit 531 (bit[81]) of the EP82 FP operand 530. The format converter 220 places the bit[62] of the exponent 513 of the DPFP operand 510a into the bit[80] of the exponent 533 of the EP82 FP operand 530, fills each of the bits[79:74] (in slashes) of the exponent 533 of the EP82 FP operand 530 with the inverse of the bit[62] of the exponent 513 of the DPFP operand 510a and places the bits[61:52] of the exponent 513 of the DPFP operand 510a into the bits[73:64] of the exponent 533 of the EP82 FP operand 530. For example, when the value of bit[62] of the exponent 513 of the DPFP operand 510a is "2'b1", the value of bits[79:74] of the exponent 533 of the EP82 FP operand 530 are filled with "2'b000000". The format converter 220 fills the imply bit 534 (bit[63]) of the EP82 FP operand 530 with "2'b1" ("2'b1" is a default value to indicate that the second format is the EP82 FP and the default value may be changed to another to indicate a different FP format in some other embodiments), places the mantissa 515 (bits[51:0]) of the DPFP operand 510a into the significant bits (bits[62:11]) of the mantissa 535 of the EP82 FP operand 530 and fills each of the remaining bits (bits[10:0]) of the mantissa 535 of the EP82 FP operand 530 with "2'b0".

The format converter 260 may employ the inverse of the conversion procedure described in FIG. 3 (also referred to as an inverse conversion procedure) to convert the calculation result 250 of the EP82 FP operand into the calculation result 270 of the EPFP operand. The format converter 260 may employ the inverse of the conversion procedure described in FIG. 4 to convert the calculation result 250 of the EP82 FP operand into the calculation result 270 of the SPFP operand. The format converter 260 may employ the inverse of the conversion procedure described in FIG. 6 to convert the calculation result 250 of the EP82 FP operand into the calculation result 270 of the DPFP operand.

Methods practiced by the format converters 220 and 260 may reuse the calculation unit 240 supporting the EP82 FP operand to deal with the input parameters of the EPFP, SPFP and DPFP operands, rather than providing different calculation units for the input parameters of the EPFP, SPFP and DPFP operands, so as to reduce circuit size. In the calculation unit 240 for more complex FP calculations (such as an FP multiplication, an FP division, etc.), since circuit size of these kinds of calculation units 240 are large, adopting the re-used calculation unit 240 introduced by the invention yields significant savings. Although embodiments of the invention describe the first formats as being EPFP, SPFP and DPFP while the second format is EP82 FP, those skilled in the art may employ arbitrary formats in the format converters prior and subsequent to the calculation unit. The invention should not be limited thereto.

Although the embodiment has been described as having specific elements in FIG. 2, it should be noted that additional elements may be included to achieve better performance without departing from the spirit of the invention. While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for calculating floating-point operands for floating point operations in multiple floating point formats using a common calculation unit, the method implemented in an execution unit of a microprocessor, comprising:
   receiving an FP (floating-point) operand in a first format from a source register, wherein the first format is one of a plurality of first formats of different kinds;
   converting the FP operand in the first format into an FP operand in a second format, wherein the second format uses more bits to express the FP operand than those used in any first format;
   using the common calculation unit to generate a calculation result in the second format by calculating the FP operand in the second format;
   converting the calculation result in the second format into a calculation result in the first format; and
   writing-back the calculation result of the first format to a register file of the microprocessor;
   wherein the first formats of different kinds comprise an EP (extension precision), an SP (single-precision) and a DP (double-precision) and the second format is EP82 (extension precision in 82 bits).

2. The method of claim 1, wherein the step for converting the FP operand in the first format into an FP operand in a second format comprises:
   using one of a plurality of conversion procedures to convert the FP operand in one of the plurality of the first formats into the FP operand in the second format according to size information,
   wherein the step for converting the calculation result in the second format into a calculation result in the first format comprises:
   using one of a plurality of inverse conversion procedures to convert the calculation result in the second format into the calculation result in the first format according to the size information, and
   wherein the size information indicates which first format the FP operand latched in the source register belongs to.

3. The method of claim 2, wherein the size information and the FP operand in the first format are transmitted to the execution unit at the same clock cycle.

4. The method of claim 1, wherein a sign bit of the EP is bit[79], an exponent of the EP contains a value of bits[78:64], a mantissa of the EP is a value of bits[63:0], a sign bit of the SP is bit[31], an exponent of the SP contains a value of bits[30:23], a mantissa of the SP is a value of bits[22:0], a sign bit of the DP is bit[63], an exponent of the DP contains a value of bits[62:52], a mantissa of the DP is a value of bits[51:0], a sign bit of the EP82 is bit[81], an exponent of the EP82 contains a value of bits[80:64], and a mantissa of the EP82 is a value of bits[63:0].

5. The method of claim 1, wherein the step for converting the FP operand in the first format into an FP operand in a second format comprises:
   placing a value of an MSB (Most Significant Bit) of an exponent of the FP operand in the first format into an MSB of an exponent of the FP operand in the second format;
   placing the inverse of the value of the MSB of the exponent of the FP operand in the first format into each of n bits following the MSB of the exponent of the FP operand in the second format, where n is a difference between a bit count of the exponent of the FP operand in the second format and a bit count of the exponent of the FP operand in the first format; and
   placing a value of the remaining bits of the exponent of the FP operand in the first format into the remaining bits of the exponent of the FP operand in the second format.

6. The method of claim 1, wherein the step for converting the FP operand in the first format into an FP operand in a second format comprises:
   except for an MSB of a mantissa of the FP operand in the second format, placing a mantissa value of the FP operand in the first format into the m significant bits following the MSB of the mantissa of the FP operand in the second format, where m is a bit count of the mantissa of the FP operand in the first format; and
   filling each of the remaining bits of the mantissa of the FP operand in the second format with "2'b0".

7. The method of claim 1, wherein the first format is an EP, and the step for converting the FP operand in the first format into an FP operand in a second format comprises:
   placing a value of bit[79] of the FP operand in the first format into bit[81] of the FP operand in the second format;
   placing a value of bit[78] of the FP operand in the first format into bit[80] of the FP operand in the second format;
   placing the inverse of the value of bit[78] of the FP operand in the first format into each of bits[79:78] of the FP operand in the second format; and
   placing a value of bits[77:0] of the FP operand in the first format into bits[77:0] of the FP operand in the second format.

8. The method of claim 1, wherein the first format is an SP, and the step for converting the FP operand in the first format into an FP operand in a second format comprises:

placing a value of bit[31] of the FP operand in the first format into bit[81] of the FP operand in the second format;

placing a value of bit[30] of the FP operand in the first format into bit[80] of the FP operand in the second format;

placing the inverse of the value of bit[30] of the FP operand in the first format into each of bits[79:71] of the FP operand in the second format;

placing a value of bits[29:23] of the FP operand in the first format into bits[70:64] of the FP operand in the second format;

filling bit[63] of the FP operand in the second format with a default value;

placing a value of bits[22:0] of the FP operand in the first format into bits[62:40] of the FP operand in the second format; and filling each of bits[39:0] of the FP operand in the second format with "2'b0".

9. The method of claim 1, wherein the first format is a DP, and the step for converting the FP operand in the first format into an FP operand in a second format comprises:

placing a value of bit[63] of the FP operand in the first format into bit[81] of the FP operand in the second format;

placing a value of bit[62] of the FP operand in the first format into bit[80] of the FP operand in the second format;

placing the inverse of the value of bit[62] of the FP operand in the first format into each of bits[79:74] of the FP operand in the second format;

placing a value of bits[61:52] of the FP operand in the first format into bits[73:64] of the FP operand in the second format;

filling bit[63] of the FP operand in the second format with a default value;

placing a value of bits[51:0] of the FP operand in the first format into bits[62:11] of the FP operand in the second format; and filling each of bits[10:0] of the FP operand in the second format with "2'b0".

10. An apparatus for calculating floating-point operands to be used in floating point operations in multiple floating point formats using a common calculation unit, implemented in an execution unit of a microprocessor, comprising:

a first format converter receiving an FP (floating-point) operand in a first format from a source register, the first format converter comprising micro-coded instructions or dedicated hardware that employ conversion procedures configured to convert the FP operand in the first format into an FP operand in a second format, wherein the first format is one of a plurality of first formats of different kinds and the second format uses more bits to express the FP operand than those used in any first format;

a common calculation unit coupled to the first format converter, generating a calculation result in the second format by calculating the FP operand in the second format; and a second format converter coupled to the common calculation unit, the second format converter comprising micro-coded instructions or dedicated hardware that employ inversion-conversion procedures configured to convert the calculation result in the second format into a calculation result in the first format and write-back the calculation result of the first format to a register file of the microprocessor;

wherein the first formats of different kinds comprise an EP (extension precision), an SP (single-precision) and a DP (double-precision) and the second format is EP82 (extension precision in 82 bits).

11. The apparatus of claim 10, wherein the first format converter uses a designated conversion procedure to convert the FP operand in one of the plurality of the first formats into the FP operand in the second format according to size information, the second format converter uses a designated inverse conversion procedure to convert the calculation result in the second format into the calculation result in the first format according to the size information, and the size information indicates which first format the FP operand latched in the source register belongs to.

12. The apparatus of claim 10, wherein the size information and the FP operand in the first format are comprised in a micro-operation, which is transmitted to the execution unit.

13. The apparatus of claim 10, wherein a sign bit of the EP is bit[79], an exponent of the EP contains a value of bits[78:64], a mantissa of the EP is a value of bits[63:0], a sign bit of the SP is bit[31], an exponent of the SP contains a value of bits[30:23], a mantissa of the SP is a value of bits[22:0], a sign bit of the DP is bit[63], an exponent of the DP contains a value of bits[62:52], a mantissa of the DP is a value of bits[51:0], a sign bit of the EP82 is bit[81], an exponent of the EP82 contains a value of bits[80:64], and a mantissa of the EP82 is a value of bits[63:0].

14. The apparatus of claim 10, wherein the first format converter places a value of an MSB (Most Significant Bit) of an exponent of the FP operand in the first format into an MSB of an exponent of the FP operand in the second format; places the inverse of the value of the MSB of the exponent of the FP operand in the first format into each of n bits following the MSB of the exponent of the FP operand in the second format, where n is a difference between a bit count of the exponent of the FP operand in the second format and a bit count of the exponent of the FP operand in the first format; and places a value of the remaining bits of the exponent of the FP operand into the first format in the remaining bits of the exponent of the FP operand in the second format.

15. The apparatus of claim 10, wherein the first format converter, except for an MSB of a mantissa of the FP operand in the second format, places a mantissa value of the FP operand in the first format into the m significant bits following the MSB of the mantissa of the FP operand in the second format, where m is a bit count of the mantissa of the FP operand in the first format; and fills each of the remaining bits of the mantissa of the FP operand in the second format with "2'b0".

16. The apparatus of claim 10, wherein the first format is an EP, and the first format converter places a value of bit[79] of the FP operand into the first format in bit[81] of the FP operand in the second format; places a value of bit[78] of the FP operand in the first format into bit[80] of the FP operand in the second format; places the inverse of the value of bit[78] of the FP operand in the first format into each of bits[79:78] of the FP operand in the second format; and places a value of bits[77:0] of the FP operand into the first format in bits[77:0] of the FP operand in the second format.

17. The apparatus of claim 10, wherein the first format is an SP, and the first format converter places a value of bit[31] of the FP operand in the first format into bit[81] of the FP operand in the second format; places a value of bit[30] of the FP operand into the first format in bit[80] of the FP operand in the second format; places the inverse of the value of bit[30] of the FP operand in the first format into each of bits[79:71] of the FP operand in the second format; places a value of bits[29:23] of the FP operand in the first format into bits[70:64] of the FP operand in the second format; fills bit[63] of the FP operand in the second format with a default value; places a value of bits[22:0] of the FP operand in the first format into bits[62:40] of the FP operand in the second format; and fills each of bits[39:0] of the FP operand in the second format with "2'b0".

18. The apparatus of claim 10, wherein the first format is a DP, and the first format converter places a value of bit[63] of the FP operand in the first format into bit[81] of the FP operand in the second format; places a value of bit[62] of the FP operand in the first format into bit[80] of the FP operand in the second format; places the inverse of the value of bit[62] of the FP operand in the first format into each of bits[79:74] of the FP operand in the second format; places a value of bits[61:52] of the FP operand in the first format into bits[73:64] of the FP operand in the second format; fills bit[63] of the FP operand in the second format with a default value; places a value of bits[51:0] of the FP operand in the first format into bits[62:11] of the FP operand in the second format; and fills each of bits[10:0] of the FP operand in the second format with "2'b0".

\* \* \* \* \*